J. C. SCHLEICHER.
FLYING MACHINE.
APPLICATION FILED MAR. 12, 1910.
998,554.
Patented July 18, 1911.
4 SHEETS—SHEET 1.
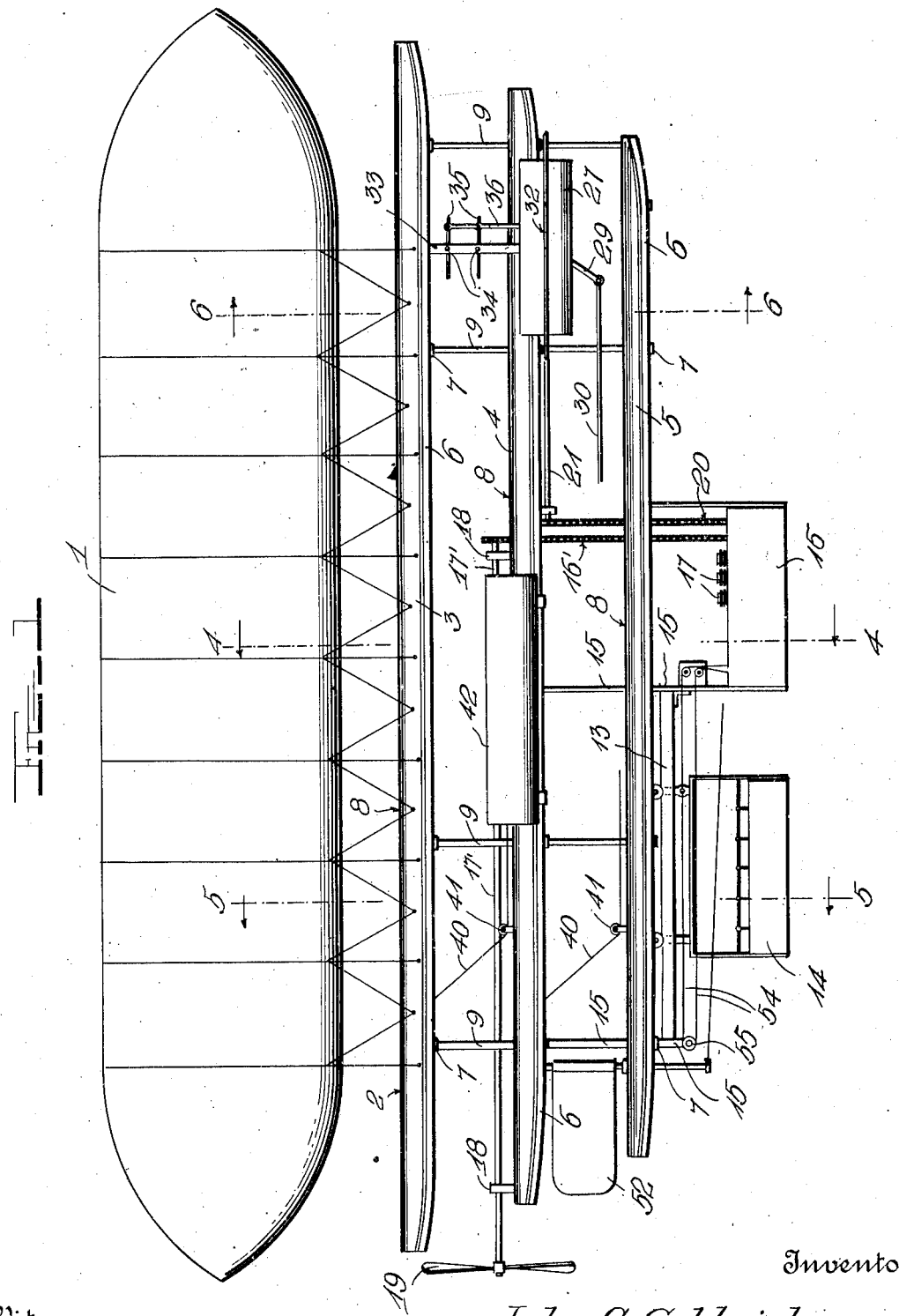
Inventor
John C. Schleicher

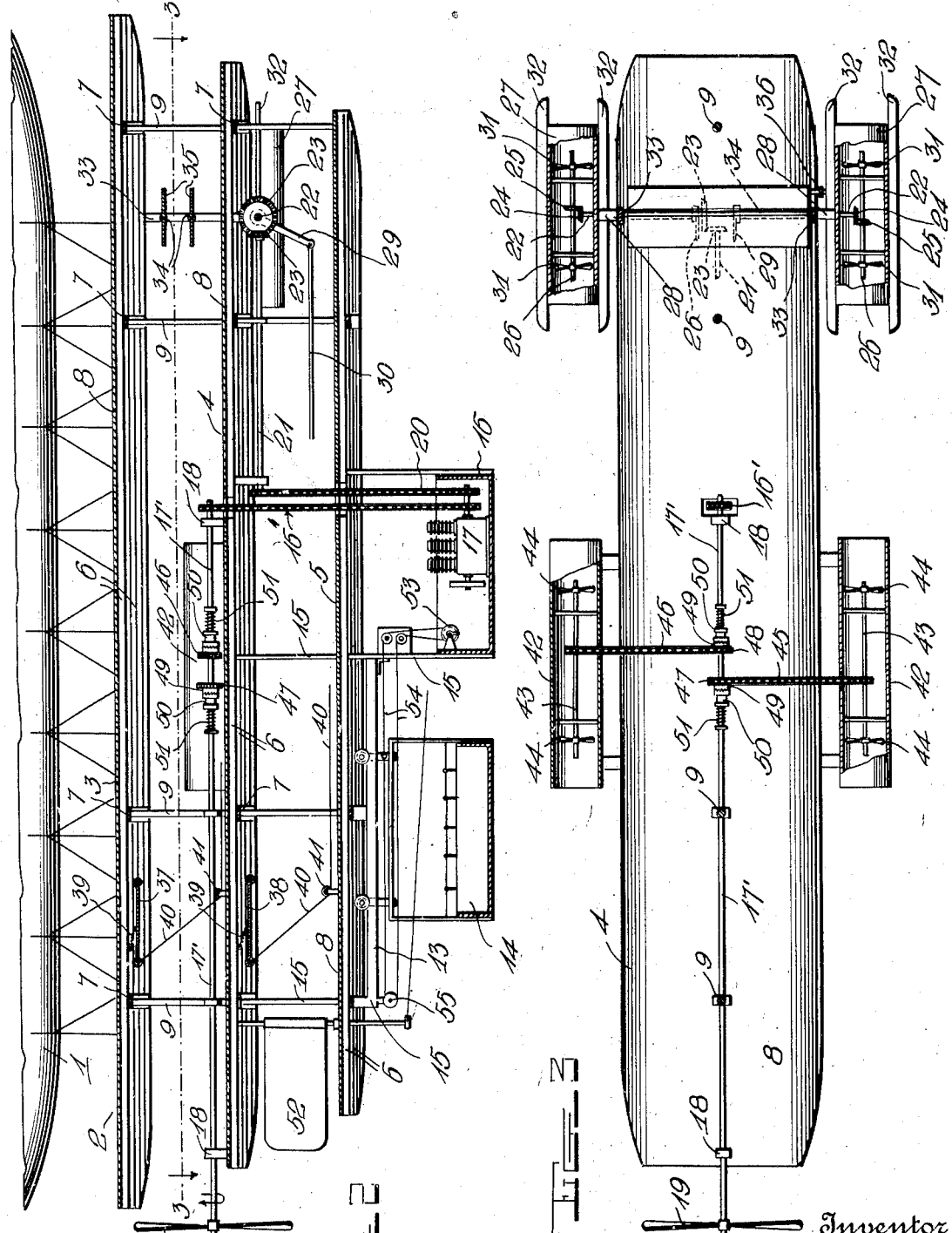

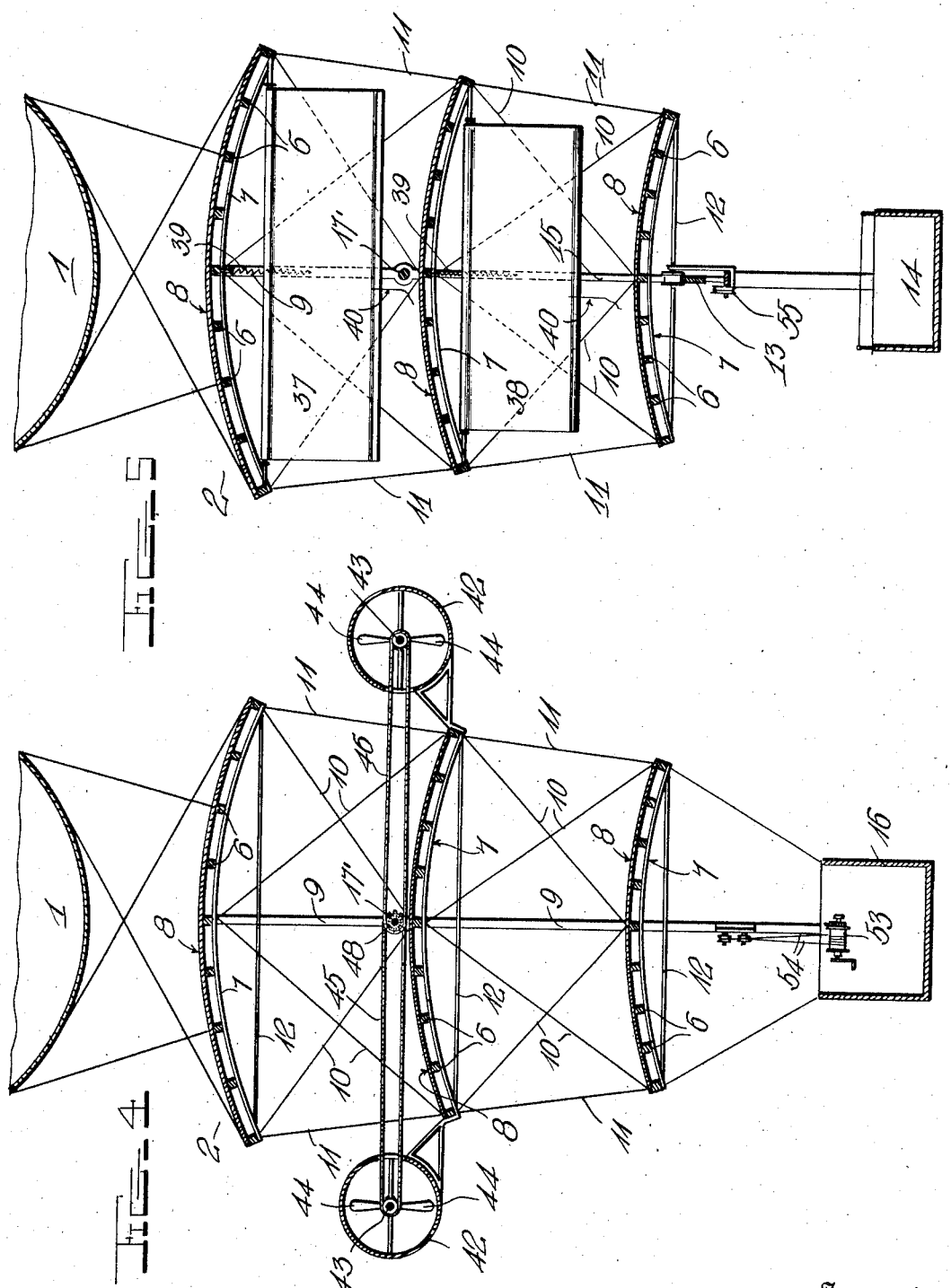

J. C. SCHLEICHER.
FLYING MACHINE.
APPLICATION FILED MAR. 12, 1910.
998,554.
Patented July 18, 1911.
4 SHEETS—SHEET 4.
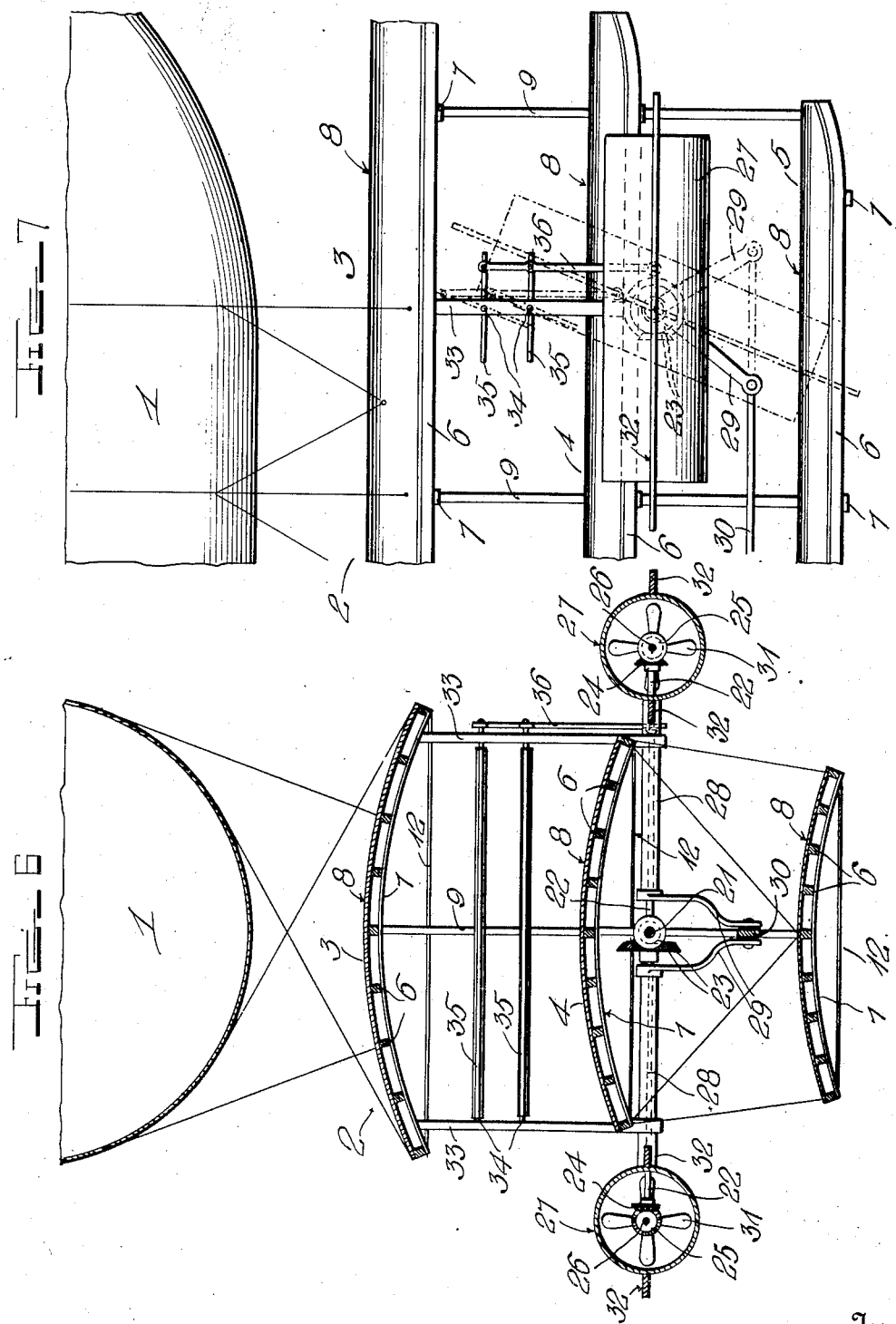
Witnesses
Inventor
John C. Schleicher
by
Attorneys

UNITED STATES PATENT OFFICE.

JOHN C. SCHLEICHER, OF MOUNT VERNON, NEW YORK.

FLYING-MACHINE.

998,554. Specification of Letters Patent. Patented July 18, 1911.

Application filed March 12, 1910. Serial No. 548,917.

*To all whom it may concern:*

Be it known that I, JOHN C. SCHLEICHER, a citizen of the United States, residing at Mount Vernon, in the county of Westchester and State of New York, have invented certain new and useful Improvements in Flying-Machines; and I do declare the following to be a full, clear, and exact description of the invention, such as will enable others skilled in the art to which it appertains to make and use the same.

This invention relates to aerial vehicles, and particularly to that type of device in which there is a combination of supporting planes and suspension bag.

One of the objects of the invention is the provision of means for controlling the elevation of the device, said means being adaptable for braking the speed device when it is desired to stop or slow down the vehicle.

A still further object of the invention is the provision of novel means for steering the vehicle and the provision of means for maintaining its equilibrium.

With the foregoing and other objects in view, the invention consists of certain novel features of construction, combination and arrangement of parts, as will be more fully described and particularly pointed out in the appended claims.

In the accompanying drawings, Figure 1 is a side elevation; Fig. 2 is a vertical central longitudinal section, omitting portions of the suspending bag; Fig. 3 is a horizontal section on the line 3—3 of Fig. 2; Fig. 4 is a vertical transverse section, taken on the line 4—4 of Fig. 1; Fig. 5 is a detail vertical section on the line 5—5 of Fig. 1; Fig. 6 is a detail vertical section on line 6—6 of Fig. 1; Fig. 7 is a fragmentary side elevation of the forward part of the machine, showing particularly the arrangement of the elevating and braking wings when in partially closed position.

Referring more especially to the drawings, 1 represents a gas bag of any suitable construction, preferably elongated as shown in Fig. 1, and which has direct connection by means of the usual netting and stays to the frame-work 2 of suspending planes. This frame-work comprises three superimposed planes 3, 4 and 5, the upper one of which is the largest, being considerably wider and longer than the other planes. The arrangement of these planes shown in Figs. 1 and 4, discloses that they decrease in length from top to bottom and also decrease in width from top to bottom, thus the upper plane 3 has the greatest sustaining power, the intermediate plane 4 having the next largest area and the lower plane 5 having the smallest amount of canvas. These planes are each constructed of longitudinal stringers 6 and cross braces 7 and over the stringers 6 is secured a thin covering 8, which may be of aluminum, canvas or any other suitable material. The planes are curved so as to present a convex upper and a concave lower surface and are connected together by vertical braces 9 and diagonal braces 10 and 11. These braces may be constructed of any suitable material but are preferably made of piano wire or the like. At any suitable intervals throughout the length of the plane, I provide cross bars or struts 12 which connect the sides of the planes together in order that they may maintain their concavo-convex form. On the struts 12 beneath the lower plane 5, I mount a track 13, upon which is slidably mounted the passenger car 14. This track is supported at its ends and in its center by hangers 15 which correspond to the vertical braces 9, but in this instance pass entirely through the lower plane 5 and are connected to the intermediate plane 4.

Suspended from the lower plane 5 in stationary position, is a motor cage 16 in which the motor 17 is mounted and in which the operator of the car sits. The motor is connected by means of a sprocket chain 16' to the main driving shaft 17' which is journaled in bearings 18 on the top of the intermediate frame 4 and extends back in the rear of the planes where it is provided with the usual propeller 19. A similar sprocket chain 20 is connected to the motor shaft and to an auxiliary driving shaft 21 which extends toward the forward end of the machine and is connected to a cross shaft 22 by beveled pinions 23. At the opposite ends of this cross shaft are secured beveled pinions 24 which are in mesh with similar pinions 25 on parallel longitudinal shafts 26 journaled in bearings in the tubes 27. These tubes are mounted on the outer ends of sleeves 28 which surround the shaft 22 and are controlled by suitably connected arms 29 which extend downwardly adjacent the center of the machine and are connected to an operating rod 30 which may be controlled and operated in any suitable manner from the car. This means is not shown as it is a common mechanical expedient and forms no part of my invention. By operating the arm 30, the tubes 27 may be tilted upon the axle 22 in any direction. The shafts 26 in the tubes 27 are provided with guiding propellers 31 which suck the air through the tubes and thus lift the forward end of the machine according to the position in which the tubes are placed. In order to accentuate this action, the tubes are provided on either side with guiding vanes 32 which, when the tube is elevated as shown in Fig. 7, assist in sustaining the forward end and cause the machine to continuously rise.

Mounted between the planes 3 and 4, on either side thereof, are vertical bearing bars 33, in which are journaled transverse shafts 34 having mounted thereon the wings 35 connected together at their forward ends on either side of the machine by the bars 36. These bars are connected to the sleeves 28 and when the tubes 27 are turned in either direction the wings will assume a similar position, entirely across the machine in between the planes. If the tubes 27 are tilted to approximately vertical position, the wings 35 overlap one another in the manner of window shutters and will prevent the air from passing between the respective planes, thereby retarding the progress of the machine. This object can be accomplished by other means, such as is shown in Figs. 2 and 5, wherein suitable gates 37 and 38 are pivoted to the underside of the planes 3 and 4 and are normally held in raised position, as shown in Fig. 2, by means of the springs 39 and also by means of the air currents passing between the planes. To the outer ends of each one of the gates, is connected a suitable operating cord 40 which runs over pulleys 41 and extends to a position in the motor cage, whereby the operator may independently control either gate 37 or 38.

Arranged intermediate the length of the machine, on either side thereof, are tubes 42 in each of which is mounted an axle 43 having secured at its ends the steering blades 44. The axles 43 are connected to the main driving shaft 17' by means of sprocket chains 45 and 46. The sprocket chain 45 passes over a loosely mounted sprocket gear 47 mounted on the shaft 17' and the sprocket chain 46 passes over a similar gear 48, said gears being provided on their outer faces with clutch members 49 adapted to engage similar clutch members 50 slidably keyed on the shaft 17' and held in constant engagement with the clutch members 49 by means of spiral springs 51. Suitable means (not shown) extends from the clutch members 50 to a point adjacent the operator's seat so that he may manipulate the same to independently control the operation of either one of the shafts or both of them, whereby the machine may be steered. For instance, if the propellers in the right hand tube are thrown out of gear, the machine will travel to the right. A suitable rudder 52 is shown which has any suitable connection with the operator's cage whereby the operator may further control the direction of the car.

In order that I may maintain the proper equilibrium of the vehicle, I connect the car 14 with a windlass 53 by means of a cable 54 which passes over a pulley 55. The windlass 53 is situated in the motor cage adjacent the operator's seat, whereby the car may be readily shifted from one point along the rail 15 to another. If there is considerable weight in the passenger car 14, it is moved up toward the motor cage whereas, when a light load is being carried, the car is shifted back toward the propeller so as to maintain the proper equilibrium of the vehicle. By such means, when taken in connection with the elevating wings and the elevating propellers shown in the forward portion of the machine, it is possible to properly maintain the car in a horizontal position.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. An aerial vehicle comprising a plurality of superposed planes, means for securing said planes in fixed spaced relation, rotary sleeves mounted transversely to said planes, inclosed steering propellers secured to the outer ends of said sleeves, pivoted retarding wings arranged between the planes and transversely thereto, connections between said wings and the sleeves, and means for rotating the sleeves.

2. An aerial vehicle comprising a plurality of superposed planes, hangers connecting said planes in fixed relation, bearing bars at the sides of the planes, retarding wings pivoted on said bars, rotary sleeves mounted transversely to the planes, means for rotating the sleeves, a bar pivoted to the ends of the wings and connected to said sleeves, and inclosed propellers on the outer ends of the sleeves.

3. An aerial vehicle comprising a plurality of superposed planes, hangers connecting the same in fixed relation, transverse rotary sleeves supported by the planes, open ended tubes secured to the ends of said sleeves and arranged parallel with the sides of the planes, a shaft within said sleeves, propellers within the tubes driven by said shaft, means for rotating said shaft, means for rotating the sleeves, and retarding wings mounted between the planes transversely thereof and connected to the sleeves.

In testimony whereof I have hereunto set my hand in presence of two subscribing witnesses.

JOHN C. SCHLEICHER.

Witnesses:
E. EDMONSTON, Jr.,
O. HOPKINS.